(12) United States Patent
Kjellqvist et al.

(10) Patent No.: US 6,254,956 B1
(45) Date of Patent: Jul. 3, 2001

US006254956B1

(54) FLOOR, WALL OR CEILING COVERING

(75) Inventors: Jerker B. I. Kjellqvist, Grüningen; Stephen R. Betso, Horgen; Ronald Wevers, Langnau, all of (CH); Johan A. Thoen, Terneuzen (NL); John O. Bieser, Houston, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/254,139

(22) PCT Filed: Jun. 26, 1997

(86) PCT No.: PCT/US97/12237

§ 371 Date: Mar. 2, 1999

§ 102(e) Date: Mar. 2, 1999

(87) PCT Pub. No.: WO98/10160

PCT Pub. Date: Mar. 12, 1998

Related U.S. Application Data

(60) Provisional application No. 60/025,431, filed on Sep. 4, 1996.

(51) Int. Cl.[7] .................................................. B32B 27/32
(52) U.S. Cl. .............................. 428/44; 428/49; 428/220; 428/232; 428/238; 428/516; 428/523; 524/553; 524/554; 524/578; 524/914; 525/211; 525/216; 525/221; 525/222; 525/231; 525/232; 525/238; 525/240; 526/282; 526/308; 526/347
(58) Field of Search ...................................... 526/347, 282, 526/308; 524/553, 554, 578, 914; 525/211, 216, 221, 222, 231, 240, 232, 238; 428/44, 49, 220, 516, 523, 339

(56) References Cited

U.S. PATENT DOCUMENTS

| | | | |
|---|---|---|---|
| 4,007,234 | 2/1977 | Schuddemage et al. | 260/878 |
| 4,438,228 * | 3/1984 | Schenck | 524/914 X |
| 4,908,411 | 3/1990 | Kinoshita et al. | 525/285 |
| 4,917,734 | 4/1990 | Demay et al. | 106/270 |
| 5,244,996 | 9/1993 | Kawasaki | 526/347 |
| 5,276,082 * | 1/1994 | Forry et al. | 524/914 X |
| 5,472,764 * | 12/1995 | Kehr et al. | 524/914 X |
| 5,739,200 | 4/1998 | Cheung et al. | 524/504 |
| 5,741,857 | 4/1998 | Esneault et al. | 525/97 |
| 5,863,986 | 1/1999 | Hermann-Schönherr et al. | 525/63 |
| 5,928,754 * | 7/1999 | Kondo et al. | 524/914 X |

FOREIGN PATENT DOCUMENTS

| | | | |
|---|---|---|---|
| 43 24 137 | 1/1995 | (DE) | E04F/15/16 |
| 0 416 815 | 3/1991 | (EP) | C08F/10/00 |
| 0 572 990 | 12/1993 | (EP) | C08F/210/02 |
| 7-278230 | 10/1995 | (JP) | C08F/210/02 |
| 8059906 | 3/1996 | (JP) | C08L/23/04 |
| WO 94/00500 | 1/1994 | (WO) | C08F/10/00 |
| WO 95/32095 | 11/1995 | (WO) | B32B/27/32 |
| WO 96/04419 | 2/1996 | (WO) | D06N/7/00 |
| WO 98/10014 | 3/1998 | (WO) | C08L/23/02 |

OTHER PUBLICATIONS

Blends Of α–Olefin/Vinylidene Aromatic Monomer or Hindered Aliphatic Vinylidene Monomer Interpolymers With Polymers of Vinylidene Aromatic Monomers, filed in United States of America on Sep. 4, 1996, Applications Serial No. 08/709,418; Applicant: Y. W. Cheung et al.

\* cited by examiner

*Primary Examiner*—Fred Teskin

(57) ABSTRACT

A floor, wall or ceiling covering which comprises one or more substantially random interpolymers prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s). The floor, wall or ceiling covering has a good balance of properties, such as sufficient flexibility and conformability to uneven or contoured surfaces for efficient application to floors, walls, or ceilings, sufficient scratch resistance, sufficient indentation resistance, indentation recovery and/or sufficient abrasion resistance.

19 Claims, No Drawings

FLOOR, WALL OR CEILING COVERING

This application claims benefit of priority from provisional application Ser. No. 60/025,431, filed Sep. 4, 1996.

FIELD OF THE INVENTION

This invention relates to floor, wall or ceiling coverings. The present invention particularly relates to floor, wall or ceiling coverings made of one or more polymeric layers.

BACKGROUND OF THE INVENTION

Materials for floor and wall coverings should possess a wide variety of properties which are sometimes not compatible. An important property of materials for floor and wall coverings is a good conformability to uneven or contoured surfaces to allow efficient application of the material to floors and walls. Particularly important for materials used for floor coverings are good wear, abrasion, scratch and indentation resistance and good indentation recovery to reduce visible scratches and indentations of furniture and rolling objects, such as office chairs. Materials for floor and wall coverings should also allow the inclusion of a high amount of a usual filler to allow the production of floor and wall coverings of a wide hardness range. The desired hardness of a flooring material varies widely depending on where the floor covering is used, for example in public or private buildings or on the type of rooms wherein the floor coverings are used. The desired hardness of a flooring material also varies widely depending on its mode of application, for example whether it is applied in the form of endless sheets or in the form of tiles.

Well known floor coverings are based on polyvinyl chloride (PVC). PVC-based materials have many desirable properties, such as good filler acceptance, flexibility and scratch resistance. However, in more recent years attention has focused on the disadvantages of PVC-based flooring, such as its chlorine content which forms hydrogen chloride upon combustion. Therefore, much effort has been made by the skilled artisans to find replacements for PVC-based floor, wall or ceiling coverings.

German patent application DE-A-43 24 137 discusses advantages and disadvantages of various PVC-free floor coverings. It discusses that floor coverings based on ethylene/vinyl acetate copolymers are inexpensive and useful in a wide variety of applications, but that their residual content of vinyl acetate comonomer and their relatively low thermal stability require special precautions in the production of the floor coverings. Floor coverings based on ethylene/butene or ethylene/1-octene copolymers of low density are also mentioned. It is discussed that these copolymers allow high filling which allows to control the flexibility and hardness of the floor. On the other hand, it is said to be difficult to provide these copolymers with a lacquer or a finishing layer to improve their resistance to wear because of the insufficient adhesion between the olefinic copolymer and the lacquer or finishing layer. To solve these problems, DE-A-43 24 127 suggests a multilayer synthetic board wherein at least one layer contains an ethylene/acrylate copolymer. Unfortunately, the ethylene/acrylate copolymer is sticky in the production process and provides low abrasion resistance.

WO 96/04419 discloses a sheet material suitable for use in or as floor covering which comprises a polyalkylene resin in intimate mixture with at least one additive comprising a filler. The polyalkylene resin has a relatively narrow molecular weight distribution (MMD) and a small amount of long chain branching. It is produced by a single site catalyzed polymerization of at least one linear, branched or cyclic alkene having from 2 to 20 carbon atoms. This sheet material has good properties, such as excellent abrasion resistance and high mechanical strength. However, the creep recovery and the scratch resistance of the sheet material is generally not very good.

Evidently no present single material can entirely fulfill the wide range of required and desired properties of floor and wall coverings, which depend on how and where the floor, wall or ceiling covering is applied and used and which often are even incompatible. Therefore, the desired properties are prioritized based on the desired end-use of the floor and wall coverings and the materials are accordingly selected. To increase the variety of materials and material properties which are suitable for floor, wall and ceiling coverings, it would be highly desirable to provide floor, wall and ceiling coverings based on other polymers than those used in the prior art. It would be particularly desirable to provide floor, wall and ceiling coverings which have a good balance of desired properties, particularly sufficient flexibility and conformability to uneven or contoured surfaces for efficient application to floors, walls or ceilings, sufficient scratch resistance, sufficient indentation resistance, indentation recovery and/or sufficient abrasion resistance.

SUMMARY OF THE INVENTION

In one aspect, the present invention relates to a floor, wall or ceiling covering which comprises one or more substantially random interpolymers prepared by polymerizing one or more $\alpha$-olefin monomers with one or more vinylidene aromatic monomers and/or one or more hindered aliphatic or cycloaliphatic vinylidene monomers, and optionally with other polymerizable ethylenically unsaturated monomer(s).

In another aspect, the present invention relates to the use of the above-mentioned substantially random interpolymer (s) for producing floor, wall or ceiling coverings.

DETAILED DESCRIPTION OF THE INVENTION

By the term "floor covering" as used herein is meant an article with a length and width which are substantially greater than its thickness, such as a sheet, tile or board, which is useful to cover at least a portion of a floor and which adheres to the floor by means of static pressure or a fastening agent, such as an adhesive system. "Substantially greater" generally means at least 10 times greater, preferably at least 50 times greater, more preferably at least 100 times greater.

By the term "wall covering" or "ceiling covering" as used herein is meant an above-mentioned article, such as a sheet, tile or board, which is useful to cover at least a portion of a wall or of a ceiling and which adheres to the wall or ceiling by means of a fastening agent, such as an adhesive system, nails or screws.

The term "interpolymer" is used herein to indicate a polymer wherein at least two different monomers are polymerized to make the interpolymer.

The term "copolymer" is used herein to indicate a polymer wherein at least two different monomers are polymerized to make the copolymer.

The interpolymers employed in the present invention include, but are not limited to substantially random interpolymers prepared by polymerizing one or more $\alpha$-olefin monomers with one or more vinylidene aromatic monomers and/or one or more hindered aliphatic or cycloaliphatic vinylidene monomers, and optionally with other polymerizable ethylenically unsaturated monomer(s).

Suitable $\alpha$-olefin monomers include, for example, $\alpha$-olefin monomers containing from 2 to about 20, preferably from 2 to about 12, more preferably from 2 to about 8 carbon atoms. Preferred such monomers include ethylene, propylene, butene-1,4-methyl-1-pentene, hexene-1 and octene-1. Most preferred are ethylene or a combination of ethylene with $C_{2-8}$-α-olefins. These α-olefins do not contain an aromatic moiety.

Suitable vinylidene aromatic monomers which can be employed to prepare the interpolymers employed in the filled polymer compositions of the present invention include, for example, those represented by the following formula:

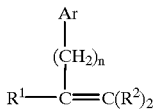

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary monovinylidene aromatic monomers include styrene, vinyl toluene, α-methylstyrone, t-butyl styrene, chlorostyrene, including all isomers of these compounds, and the like. Particularly suitable such monomers include styrene and lower alkyl- or halogen-substituted derivatives thereof. Preferred monomers include styrene, a-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic monovinylidene monomer is styrene.

By the term "hindered aliphatic or cycloaliphatic vinylidene monomers", it is meant addition polymerizable vinylidene monomers corresponding to the formula:

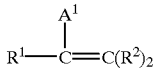

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. α-olefin monomers containing from 2 to about 20 carbon atoms and having a linear aliphatic structure such as propylene, butene-1, hexene-1 and octene-1 are not considered as hindered aliphatic monomers. Preferred hindered aliphatic or cycloaliphatic vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

The interpolymers of one or more α-olefins and one or more monovinylidene aromatic monomers and/or one or more hindered aliphatic or cycloaliphatic vinylidene monomers employed in the present invention are substantially random polymers. These interpolymers usually contain from about 0.5 to about 65, preferably from about 1 to about 55, more preferably from about 2 to about 50, most preferably from about 20 to about 50, particularly from about 30 to about 50 mole percent of at least one vinylidene aromatic monomer and/or hindered aliphatic or cycloaliphatic vinylidene monomer and from about 35 to about 99.5, preferably from about 45 to about 99, more preferably from about 50 to about 98, most preferably from about 50 to about 80, particularly from about 50 to about 70 mole percent of at least one aliphatic α-olefin having from 2 to about 20 carbon atoms.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/s tyrene/norbornene.

The number average molecular weight (Mn) of the interpolymers is usually greater than about 5,000, preferably from about 20,000 to about 1,000,000, more preferably from about 50,000 to about 500,000. The melt index $I_2$ according to ASTM D 1238 Procedure A, condition E, generally is from about 0.01 to about 50 g/10 min., preferably from about 0.01 to about 20 g/10 min., more preferably from about 0.1 to about 10 g/10 min., and most preferably from about 0.5 to about 5 g/10 min. The glass transition temperature (Tg) of the interpolymers is preferably from about −40° C. to about +35° C., preferably from about 0° C. to about +30° C., most preferably from about +10° C. to about +25° C., measured according to differential mechanical scanning (DMS). The density of the interpolymers preferably is from about 0.95 to about 1.11 g/cm$^3$, more preferably from about 0.96 to about 1.05 g/cm$^3$, most preferably from about 0.97 to about 1.03 g/cm$^3$.

Particularly preferred α-olefin/vinylidene aromatic interpolymers contain from about 30 to about 50 mole percent of at least one interpolymerized vinylidene aromatic monomer and a Tg from about 15° C. to about 25° C.

Polymerizations and unreacted monomer removal at temperatures above the autopolymerization temperature of the respective monomers may result in formation of some amounts of homopolymer polymerization products resulting from free radical polymerization. For example, while preparing the substantially random interpolymer, an amount of atactic vinylidene aromatic homopolymer may be formed due to homopolymerization of the vinylidene aromatic monomer at elevated temperatures. The vinylidene aromatic homopolymer may be separated from the interpolymer, if desired, by extraction techniques such as selective precipitation from solution with a non solvent for either the interpolymer or the vinylidene aromatic homopolymer. For the purpose of the present invention it is preferred that no more than 20 weight percent, preferably less than 15 weight percent based on the total weight of the interpolymers of vinylidene aromatic homopolymer is present.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers can be prepared as described in U.S. application Ser. No. 07/545,403 filed Jul. 3, 1990 (corresponding to EP-A-0,416,815) by James C. Stevens et al. and in allowed U.S. application Ser. No. 08/469,828 filed Jun. 6, 1995, now U.S. Patent No. 5,703, 187, all of which are incorporated herein by reference in their entirety. Preferred operating conditions for such polymerization reactions are pressures from atmospheric up to 3,000 atmospheres and temperatures from −30° C. to 200° C.

Examples of suitable catalysts and methods for preparing the substantially random interpolymers are disclosed in U.S. application Ser. No. 07/545,403, filed Jul. 3, 1990, (corresponding to EP-A-416,815); U.S. application Ser. No. 547,718) filed Jul. 3, 1990, now abandoned (corresponding to EP-A-468,651); U.S. application Ser. No. 07/702,475, filed May 20, 1991, now abandoned, (corresponding to EP-A-514,828); U.S. application Ser. No. 07/876,268, filed May 1, 1992, now U.S. Pat. No. 5,721,185 (corresponding to EP-A-520,732); U.S. application Ser. No. 884,966, filed May 15, 1992, now U.S, Pat. No. 5,350,723 (corresponding to WO 93/23412); U.S. Pat. No. 5,374,696, filed Jan. 21, 1993; U.S. application Ser. No. 34,434, filed Mar. 19, 1993, now U.S. Pat. No. 5,347,024 (corresponding to WO 94/01647); U.S. application Ser. No. 08/241,523, filed May 12, 1994, now U.S. Pat. No. 5,470,993 (corresponding to WO 94/06834 and EP 0,705,269); as well as U.S. Pat. Nos. 5,055,438; 5,057,475; 5,096,867; 5,064,802; 5,132,380; and 5,189,192; 5,321,106; 5,347,024; 5,350,723; 5,374,696; 5,399,635; 5,460,993 and 5,556,928 all of which patents and applications are incorporated herein by reference in their entirety.

The substantially random α-olefin/vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in Plastics Technology, page 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U. S. application Ser. No. 0/708,869, filed Sep. 4, 1996 by Francis J. Timmers et al., now abandoned, equivalent to WO98/09999, published Dec. 31, 1998. These interpolymers contain additional signals with intensities greater than three times the peak to peak noise. These signals appear in the chemical shift range 43.75 to 44.25 ppm and 38.0 to 38.5 ppm. Specifically, major peaks are observed at 44.1,43.9 and 38.2 ppm. A proton test NMR experiment indicates that the signals in the chemical shift range 43.75 to 44.25 ppm are methine carbons and the signals in the region 38.0 to 38.5 ppm are methylene carbons.

In order to determine the carbon-[13] NMR chemical shifts of the interpolymers described, the following procedures and conditions are employed. A five to ten weight percent polymer solution is prepared in a mixture consisting of 50 volume percent 1,1,2,2-tetrachloroethane-d2 and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-[13] NMR peaks but with slightly different chemical shifts.

These interpolymers are prepared by conducting the polymerization at temperatures of from about −30° C. to about 250° C. in the presence of such catalysts as those represented by the formula

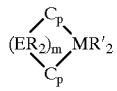

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hyrocarbyloxy, silahydrocarbyl, hydrocarbylsilyl containing up to about 30, preferably from 1 to about 20, more preferably from 1 to about 10, carbon or silicon atoms or two R' groups together can be a C1–10 hydrocarbyl substituted 1,3-butadiene; m is 1 or 2; and optionally, but preferably in the presence of an activating cocatalyst, such as tris (pentafluorophenyl)borane or methylalumoxane (MAO). Particularly, suitable substituted cyclopentadienyl groups include those illustrated by the formula:

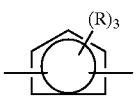

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl(2-methyl-4-phenylindenyl)) zirconium dichloride, racemic-(dimethylsilanediyl(2-methyl-4-phenylindenyl))zirconium 1,4-diphenyl-1,3-butadiene, racemic-(dimethylsilanediyl(2-methyl-4-phenylindenyl))zirconium di-C1–4 alkyl, racemic-(dimethylsilanediyl(2-methyl-4-phenylindenyl))zirconium di-C1–4 alkoxide, or any combination thereof and the like.

Further preparative methods for the interpolymer in the present invention have been described in the literature. Longo and Grassi (Makromol. Chem., Volume 191, pages 2387 to 2396 [1990]) and D'Anniello et al. (Journal of Applied Polymer Science, Volume 58, pages 1701 to 1706 [1995]) reported the use of a catalytic system based on methylalumoxane (MAO) and cyclopentadienyltitanium trichloride (CpTiCl$_3$) to prepare an ethylene-styrene copolymer. Xu and Lin (Polymer Preprints, Am.Chem.Soc., Div.Polym.Chem.) Volume 35, pages 686, 687 [1994]) have reported copolymerization using a MgCl$_2$/TiCl$_4$/NdCl$_3$/Al (iBu)$_3$ catalyst to give random copolymers of styrene and propylene. Lu et al (Journal of Applied Polymer Science, Volume 53, pages 1453 to 1460 [1994]) have described the copolymerization of ethylene and styrene using a TiCl$_4$/NdCl$_3$/MgCl$_2$/Al(Et)$_3$ catalyst. Sernetz and Mulhaupt, (Macromol. Chem. Phys., v. 197, pages 1071 to 1083, 1997) have described the influence of polymerization conditions on the copolymerization of styrene with ethylene using Me$_2$Si(Me$_4$Cp) (N-tert-butyl) TiCl$_2$/methylaluminoxane Ziegler-Natta catalysts. The manufacture of α-olefin/vinyl aromatic monomer interpolymers such as propylene/styrene and butene/styrene are described in U.S. Pat. No. 5,244,996, issued to Mitsui Petrochemical Industries Ltd. All the above methods disclosed for preparing the interpolymer component are incorporated herein by reference.

The floor, wall or ceiling covering of the present invention preferably contains from about 5 to about 100 percent, more preferably from about 10 to about 100 percent, most preferably from about 40 to about 98 percent, of the substantially random interpolymer, based on the total weight of the floor, wall or ceiling covering.

The floor, wall or ceiling covering of the present invention may contain one or more other polymers in addition to one or more of the above-described substantially random interpolymers. If present, their amount generally is up to about 90 percent, preferably from about 5 to about 80 percent, more preferably from about 15 to about 60 percent, most preferably from about 20 to about 50 percent, based upon the total weight of the floor, wall or ceiling covering.

The floor, wall or ceiling covering of the present invention may by monolayer or multilayer. In monolayer floor, wall or ceiling coverings such additional, optional polymer(s) is/are blended with the described substantially random interpolymer(s). In multilayered floor, wall or ceiling coverings such additional, optional polymer(s) may be comprised in the same as and/or in a different layer than the substantially random interpolymer(s).

Preferred additional, optional polymers are monovinylidene aromatic polymers or styrenic block copolymers. The most preferred additional, optional polymers are homopolymers or interpolymers of aliphatic α-olefins having from 2 to about 20 carbon atoms or α-olefins having from 2 to about 20 carbon atoms and containing polar groups.

Suitable monovinylidene aromatic polymers include homopolymers or interpolymers of one or more monovinylidene aromatic monomers, or interpolymers of one or more monovinylidene aromatic monomers and one or more monomers interpolymerizable therewith other than an aliphatic α-olefin. Suitable monovinylidene aromatic monomers are represented by the following formula:

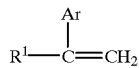

wherein R$^1$ and Ar have the meanings stated in formula I above. Exemplary monovinylidene aromatic monomers are those listed under formula I above, particularly styrene.

Examples of suitable interpolymerizable comonomers other than a monovinylidene aromatic monomer include, for example, C$_4$–C$_6$ conjugated dienes, especially butadiene or isoprene, N-phenyl maleimide, acrylamide, ethylenically-unsaturated nitrile monomers such as acrylonitrile and methacrylonitrile, ethylenically-unsaturated mono- and difunctional carboxylic acids and derivatives thereof such as esters and, in the case of difunctional acids, anhydrides, such as acrylic acid, C$_{1-4}$-alkylacrylates or methacrylates, such as n-butyl acrylate and methyl methacrylate, maleic anhydride, etc. In some cases it is also desirable to copolymerize a cross-linking monomer such as a divinyl benzene into the monovinylidene aromatic polymer.

The polymers of monovinylidene aromatic monomers with other interpolymerizable comonomers preferably contain, polymerized therein, at least 50 percent by weight and, preferably, at least 90 percent by weight of one or more monovinylidene aromatic monomers.

Styrenic block polymers are also useful as an additional, optional polymer in the floor, wall or ceiling covering of the present invention. The term "block copolymer" is used herein to mean elastomers having at least one block segment of a hard polymer unit and at least one block segment of a rubber monomer unit. However, the term is not intended to include thermoelastic ethylene interpolymers which are, in general, random polymers. Preferred block copolymers contain hard segments of styrenic type polymers in combination with saturated or unsaturated rubber monomer segments. The structure of the block copolymers useful in the present invention is not critical and can be of the linear or radial type, either diblock or triblock, or any combination of thereof.

Suitable unsaturated block copolymers include those represented by the following formulas:

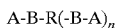

or

wherein each A is a polymer block comprising a monovinylidene aromatic monomer, preferably styrene, and each B is a polymer block comprising a conjugated diene, preferably isoprene or butadiene, and optionally a monovinylidene aromatic monomer, preferably styrene; R is the remnant of a multifunctional coupling agent; n is an integer from 1 to about 5; x is zero or 1; and y is a number from zero to about 4.

Methods for the preparation of such block copolymers are known in the art. Suitable catalysts for the preparation of useful block copolymers with unsaturated rubber monomer units include lithium based catalysts and especially lithium-alkyls. U.S. Pat. No. 3,595,942 describes suitable methods for hydrogenation of block copolymers with unsaturated rubber monomer units to from block copolymers with saturated rubber monomer units. The structure of the polymers is determined by their methods of polymerization. For example, linear polymers result by sequential introduction of the desired rubber monomer into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the block copolymers with unsaturated rubber monomer units of three or more. Coupling may be effected with multifunctional coupling agents such as dihaloalkanes or alkenes and divinyl benzene as well as with certain polar compounds such as silicon halides, siloxanes or esters of monohydric alcohols with carboxylic acids. The presence of any coupling residues in the polymer may be ignored for an adequate description of the block copolymers forming a part of the composition of this invention.

Suitable block copolymers having unsaturated rubber monomer units includes, but is not limited to, styrene-butadiene (SB), styrene-isoprene (SI), styrene-butadiene-styrene (SBS), styrene-isoprene-styrene (SIS), α-methylstyrene-butadiene-α-methylstyrene and α-methylstyrene-isoprene-α-methylstyrene, and the like.

The styrenic portion of the block copolymer is preferably a polymer or interpolymer of styrene and its analogs and homologs including α-methylstyrene and ring-substituted styrenes, particularly ring-methylated styrenes. The preferred styrenics are styrene and α-methylstyrene, and styrene is particularly preferred.

Block copolymers with unsaturated rubber monomer units may comprise homopolymers of butadiene or isoprene or they may comprise copolymers of one or both of these two dienes with a minor amount of styrenic monomer.

Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styreneiethylene-butene copolymers, styrene/ethylene-propylene copolymers, styrene/ethylene-butene/styrene (SEBS) copolymers, styrene/ethylene-propylene/styrene (SEPS) copolymers, and the like.

Hydrogenation of block copolymers with unsaturated rubber monomer units is preferably effected by use of a catalyst comprising the reaction products of an aluminum alkyl compound with nickel or cobalt carboxylates or alkoxides under such conditions as to substantially completely hydrogenate at least 80 percent of the aliphatic double bonds while hydrogenating no more than about 25 percent of the styrenic aromatic double bonds. Preferred block copolymers are those where at least 99 percent of the aliphatic double bonds are hydrogenated while less than 5 percent of the aromatic double bonds are hydrogenated.

The proportion of the styrenic blocks is generally between about 8 and 65 percent by weight of the total weight of the block copolymer. Preferably, the block copolymers contain from 10 to 35 weight percent of styrenic block segments and from 90 to 65 weight percent of rubber monomer block segments, based on the total weight of the block copolymer.

The average molecular weights of the individual blocks may vary within certain limits. In most instances, the styrenic block segments will have number average molecular weights in the range of about 5,000 to about 125,000, preferably from about 7,000 to about 60,000 while the rubber monomer block segments will have average molecular weights in the range of about 10,000 to about 300,000, preferably from about 30,000 to about 150,000. The total average molecular weight of the block copolymer is typically in the range of about 25,000 to about 250,000, preferably from about 35,000 to about 200,000.

Further, the various block copolymers suitable for use in the present invention may be modified by graft incorporation of minor amounts of functional groups, such as, for example, maleic anhydride by any of the methods well known in the art.

Block copolymers useful in the present invention are commercially available, such as, for example, supplied by Shell Chemical Company under the designation of KRATON™ and supplied by Dexco Polymers under the designation of VECTOR™.

Preferred additional, optional polymers are homopolymers or interpolymers of aliphatic α-olefins having from 2 to about 20, preferably 2 to about 18, more preferably 2 to about 12, carbon atoms or α-olefins having from 2 to about 20, preferably 2 to about 18, more preferably 2 to about 12, carbon atoms and containing polar groups.

Suitable aliphatic α-olefin monomers which introduce polar groups into the polymer include, for example, ethylenically unsaturated nitriles such as acrylonitrile, methacrylonitrile, ethacrylonitrile, etc.; ethylenically unsaturated anhydrides such as maleic anhydride; ethylenically unsaturated amides such as acrylamide, methacrylamide etc.; ethylenically unsaturated carboxylic acids (both mono- and difunctional) such as acrylic acid and methacrylic acid, etc.; esters (especially lower, e.g. $C_1$–$C_6$, alkyl esters) of ethylenically unsaturated carboxylic acids such as methyl methacrylate, ethyl acrylate, hydroxyethylacrylate, n-butyl acrylate or methacrylate, 2-ethyl-hexylacrylate etc.; ethyl-enically unsaturated dicarboxylic acid imides such as N-alkyl or N-aryl maleimides such as N-phenyl maleimide, etc. Preferably such monomers containing polar groups are acrylic acid, vinyl acetate, maleic anhydride and acrylonitrile. Halogen groups which can be included in the polymers from aliphatic α-olefin monomers include fluorine, chlorine and bromine; preferably such polymers are chlorinated polyethylenes (CPEs) or polyvinyl chloride. Preferred olefinic polymers for use in the present invention are homopolymers or interpolymers of an aliphatic, including cycloaliphatic, α-olefin having from 2 to 18 carbon atoms. Suitable examples are homopolymers of ethylene or propylene, and interpolymers of two or more α-olefin monomers. Other preferred olefinic polymers are interpolymers of ethylene and one or more other α-olefins having from 3 to 8 carbon atoms. Preferred comonomers include 1-butene, 4-methyl-1-pentene, 1-hexene, and 1-octene. The olefinic polymer may also contain, in addition to the α-olefin, one or more non-aromatic monomers interpolymerizable therewith. Such additional interpolymerizable monomers include, for example, $C_4$–$C_{20}$ dienes, preferably, butadiene or 5 ethylidene-2-norbornene. The olefinic polymers can be further characterized by their degree of long or short chain branching and the distribution thereof.

One class of olefinic polymers is generally produced by a high pressure polymerization process using a free radical initiator resulting in the traditional long chain branched low density polyethylene (LDPE). LDPE employed in the present composition usually has a density of less than 0.94 g/cc (ASTM D 792) and a melt index of from 0.01 to 100, and preferably from 0.1 to 50 grams per 10 minutes (as determined by ASTM Test Method D 1238, condition I).

Another class is the linear olefin polymers which have an absence of long chain branching, as the traditional linear low density polyethylene polymers (heterogeneous LLDPE) or linear high density polyethylene polymers (HDPE) made using Ziegler polymerization processes (for example, U.S. Pat. No. 4,076,698 (Anderson et al.), sometimes called heterogeneous polymers.

HDPE consists mainly of long linear polyethylene chains. The HDPE employed in the present composition usually has a density of at least 0.94 grams per cubic centimeter (g/cc) as determined by ASTM Test Method D 1505, and a melt index (ASTM-1238, condition I) in the range of from 0.01 to 100, and preferably from 0.1 to 50 grams per 10 minutes.

The heterogeneous LLDPE employed in the present composition generally has a density of from 0.85 to 0.94 g/cc (ASTM D 792), and a melt index (ASTM-1238, condition I) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3 to 8 carbon atoms. Preferred comonomers include 1-butene, 4-methyl-1-pentene, 1-hexene, and 1-octene.

A further class is that of the uniformly branched or homogeneous polymers (homogeneous LLDPE). The homogeneous polymers contain no long chain branches and have only branches derived from the monomers (if having more than two carbon atoms). Homogeneous polymers include those made as described in U.S. Pat. No. 3,645,992 (Elston), and those made using single site catalysts in a reactor having relatively high olefin concentrations [as described in U.S. Pat. Nos. 5,026,798 and 5,055,438 (Canich)]. The uniformly branched/homogeneous polymers are those polymers in which the comonomer is randomly distributed within a given interpolymer molecule and wherein the interpolymer molecules have a similar ethylene/comonomer ratio within that interpolymer.

The homogeneous LLDPE employed in the present composition generally has a density of from 0.85 to 0.94 g/cc (ASTM D 792), and a melt index (ASTM-1238, condition I)

in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3 to 8 carbon atoms. Preferred comonomers include 1-butane, 4-methyl-1-pentene, 1-hexene, and 1-octene.

Further, there is the class of substantially linear olefin polymers (SLOP) that may advantageously be used in component (B) of the blends of the present invention. These polymers have a proccessability similar to LDPE, but the strength and toughness of LLDPE. Similar to the traditional homogeneous polymers, the substantially linear ethylene/α-olefin interpolymers have only a single melting peak, as opposed to traditional Ziegler polymerized heterogeneous linear ethylene/α-olefin interpolymers which have two or more melting peaks (determined using differential scanning calorimetry). Substantially linear olefin polymers are disclosed in U.S. Pat. Nos. 5,380,810; 5,272,236 and 5,278,272 which are incorporated herein by reference.

The density of the SLOP as measured in accordance with ASTm D-792 is generally from 0.o5 g/cc to 0.97 g/cc, preferably from 0.85 g/cc to 0.955 g/cc, and especially from 0.85 g/cc to 0.92 g/cc.

The melt index, according to ASTM D-1238, Condition 190° C./2.16 kg (also known as $I_2$) of the SLOP is generally from 0.01 g/10 min. to 1000 g/10 min., preferably from 0.01 g/10 min. to 100 g/10 min., and especially from 0.01 g/10 min. to 10 g/10 min.

Also, included are the ultra low molecular weight ethylene polymers and ethylene/α-olefin interpolymers described in the WO patent application no. 97/01181 entitled Ultralow Molecular Weight Polymers, filed on Jan. 22, 1997, which is incorporated herein by reference. These ethylene/α-olefin interpolymers have $I_2$ melt indices greater than 1,000, or a number average molecular weight (Mn) less than 11,000.

The more preferred homopolymers or interpolymers of aliphatic α-olefins having from 2 to about 20 carbon atoms and optionally containing polar groups are homopolymers of ethylene; homopolymers of propylene, copolymers of ethylene and at least other α-olefin containing from 4 to about 8 carbon atoms; copolymers of propylene and at least other α-olefin containing from 4 to about 8 carbon atoms; copolymers of ethylene and at least one of acrylic acid, vinyl acetate, maleic anhydride or acrylonitrile; copolymers of propylene and at least one of acrylic acid, vinyl acetate, maleic anhydride or acrylonitrile; and terpolymers of ethylene, propylene and a diene. Especially preferred are LDPE, RDPE, heterogeneous and homogeneous LLDPE, SLOP, polypropylene (PP), especially isotactic polypropylene and rubber toughened polypropylenes, or ethylene-propylene interpolymers (EP), or ethylene-vinyl acetate copolymers, or ethylene-acrylic acid copolymers, or any combination thereof.

Particularly preferred is a blend comprising from about 5 to about 99 percent, preferably from about 10 to about 95 percent, more preferably from about 20 to about 80 percent, of the above-described substantially random interpolymer(s) and from about 95 to about 1 percent, preferably from about 90 to about 5 percent, more preferably from about 80 to about 20 percent, of one or more of the above-described homopolymers or interpolymers of aliphatic α-olefins having from 2 to about 20 carbon atoms or α-olefins having from 2 to about 20 carbon atoms and containing polar groups, based on the total weight of the blend. It has been found that floor, wall or ceiling coverings made of or containing such blends as a top layer exhibit a surprisingly good abrasion resistance.

In a preferred aspect of the present invention the blend comprises from about 50 to about 99 percent, preferably from about 60 to about 95 percent, more preferably from about 70 to about 90 percent, of the above-described substantially random interpolymer(s) and from about 1 to about 50, preferably from about 5 to about 40 percent, most preferably from about 10 to about 30 percent of one or more of the above-described homopolymers or interpolymers of aliphatic α-olefins having from 2 to about 20 carbon atoms or α-olefins having from 2 to about 20 carbon atoms and containing polar groups, based on the total weight of the blend. Floor, wall or ceiling coverings containing such blends generally exhibit a good indentation resistance at high load and an excellent scratch resistance.

Moreover, floor, wall or ceiling coverings containing such blends generally exhibit a good abrasion resistance.

The floor, wall or ceiling covering of the present invention may contain a filler. If present, its amount generally is up to about 95 percent, preferably from about 10 to about 90, more preferably from about 30 to about 85 percent, based on the total weight of the floor, wall or ceiling covering. The preferred amount of filler greatly varies, depending on the desired stiffness and mode of application of the floor, wall or ceiling covering. Floor, wall or ceiling sheetings preferably do not contain a filler. However, if they contain a filler, the amount of the filler preferably is from about 10 to about 70 percent, more preferably from about 15 to about 50 percent, based on the total weight of the sheeting. Floor tiles, wall tiles or ceiling tiles preferably contain from about 50 to about 95 percent, more preferably from about 70 to about 90 percent of a filler, based on the weight of the floor, wall or ceiling covering. α-olefin/vinylidene interpolymers surprisingly display a high compatibility with a wide variety of fillers. Useful fillers include organic and inorganic fillers, such as saw dust, wood fillers, such as wood flour or wood fibers, paper fibers, corn husks, straw, cotton, carbon black or graphite, talc, calcium carbonate, flyash, alumina trihydrate, glass fibers, marble dust, cement dust, clay, feldspar, silica or glass, fumed silica, alumina, magnesium oxide, zinc oxide, barium sulfate, aluminum silicate, calcium silicate, titanium dioxide, titanates, glass microspheres or chalk. Of these fillers, barium sulfate, talc, calcium carbonate, barium sulfate, silica/glass, glass fibers, alumina and titanium dioxide, and mixtures thereof are preferred. The term "a filler" as used herein includes a mixture of different fillers.

The floor, wall or coiling covering of the present invention preferably is substantially free of halogen-containing compounds, such as polyvinyl chloride, polyvinylidene chloride, or halogen-containing flame retardants. By the term "substantially free of halogen-containing compounds" is meant that halogen-containing compounds usually do not amount to more than about 10 percent, preferably not more than about 5 percent, more preferably not more than about 2 percent, most preferably not more than about 1 percent, based on the total weight of the floor, wall or ceiling covering. Most preferably, the floor, wall or coiling covering of the present invention does not contain any measurable amount of halogen-containing compounds.

The floor, wall or calling covering of the present invention may contain one or more additives, for example antioxidants, such as hindered phenols or phosphites; light stabilizers, such as hindered amines; plasticizers, such as dioctylphthalate or epoxidized soy bean oil; tackifiers, such as known hydrocarbon tackifiers; waxes, such as polyethylene waxes; processing aids, such as stearic acid or a metal salt thereof; crosslinking agents, such as peroxides or silanes; colorants or pigments to the extent that they do not interfere with the good conformability to uneven or contoured surfaces, scratch resistance and/or indentation recovery of the floor, wall or ceiling covering of the present invention. The additives are employed in functionally equivalent amounts known to those skilled in the art, generally in amounts of up to about 30, preferably from about 0.01 to about 5, more preferably from about 0.02 to about I percent by weight, based upon the weight of the floor, wall or ceiling covering.

The floor, wall or ceiling covering of the present invention generally has a thickness of from about 0.025 mm to about 25 mm, preferably from about 0.1 mm to about 10 mm. Floor coverings preferably have a thickness from about 1 mm to about 10 mm, more preferably from about 1 mm to about 5 mm, most preferably from about 1.5 mm to about 4 mm. Wall coverings preferably have a thickness from about 0.1 to about 3 mm, more preferably from about 0.5 to about 2 mm, most preferably from about 0.5 to about 1.5 mm.

In one preferred embodiment of the present invention, the floor, wall or ceiling covering of the present invention is a monolayer structure which contains the above described substantially random interpolymer(s) and optional additive (s). The thickness of such a monolayer structure is preferably from about 0.025 mm to about 15 mm, more preferably from about 1.5 mm to about 4 mm.

In another preferred embodiment of the present invention, the floor, wall or ceiling covering contains at least two layers wherein at least one layer (A) comprises one or more of the above-described substantially random interpolymer(s). The layer(s) (A) generally contains from about 5 percent to about 100 percent, preferably from about 25 percent to about 100 percent, more preferably from about 40 percent to about 100 percent, most preferably from about 80 percent to about 100 percent, of the substantially random interpolymer(s), based on the total weight of the layer(s) A. Layer(s) (A) can comprise one or more additional, optional polymers and/or other optional additives, such as a filler, as described above. If a layer (A) comprises an additional, optional polymer, the blends described further above are preferred. The amount of a filler, if present, is generally from 0 percent to about 80 percent, preferably from 0 percent to about 60 percent, more preferably from about 20 percent to about 60 percent, based on the total weight of layer(s) (A). The thickness of layer (A) is preferably from about 0.025 mm to about 2 mm, preferably from about 0.060 mm to about 1 mm, more preferably from about 0.1 mm to about 1 mm.

Layer (A) can represent the top layer, the bulk layer and/or the bottom layer or the floor, wall or ceiling covering of the present invention. Regardless whether layer (A) is the top, bulk or bottom layer, it improves the conformability of the floor, wall or ceiling covering material to floors or walls, which allows easier application and which enables the floor, wall or ceiling covering to stay flat on the floor or wall. Furthermore, layer (A) generally provides good indentation resistance to the multilayer structure, regardless of whether layer (A) represents the top, bulk or bottom layer.

Preferably, layer (A) represents the top layer. It provides excellent scratch resistance to the multilayer structure.

Preferably, the floor, wall or ceiling covering of a the present invention containing an above-described layer (A) and one or more additional polymeric layers (B). Preferred polymers in such a additional polymeric layer(s) (B) are the above described monovinylidene aromatic polymers, styrenic block copolymers, or more preferably, homopolymers or interpolymers of aliphatic α-olefins having from 2 to about 20 carbon atoms or α-olefins having from 2 to about 20 carbon atoms and containing polar groups. Alternatively, layer (B) can comprise a one or more above-described substantially random interpolymer(s), wherein the average molar content of the vinylidene monomer component in the interpolymer(s) in layer (B) is different from the average molar content of the vinylidene monomer component in the interpolymer(s) in layer (A). The layer(s) (B) generally contain from about 5 percent to about 100 percent, preferably from about 15 percent to about 100 percent, more preferably from about 40 percent to about 90 percent, most preferably from about 60 percent to about 80 percent, of the described polymer(s), based on the total weight of the layer(s) B. Layer(s) (B) can comprise one or more additional, optional polymers and/or one or more other optional additives, such as a filler, as described above. The amount of a filler, if present, is generally from about 10 percent to about 90 percent, preferably from 10 percent to 75 percent, more preferably from about 30 percent to about 50 percent, based on the total weight of layer(s) (B).

The thickness ratio between layer (A) and layer (B) is preferably from about 0.01:1 to about 10:1, more preferably from about 0.1:1 to about 5:1, most preferably from about 0.2:1 to about 5:1.

The floor, wall or ceiling covering of the present invention can comprise one or more additional layers which are common in floor, wall or ceiling coverings, such as A one or more adhesive layers and/or one or more decorative layers. The decorative layer can be arranged on top of layer (A), however, preferably it is arranged between layer (A) and layer (B).

The above-described substantially random interpolymer (s) can be combined with optional additives and processed to the floor and wall covering of the present invention by any suitable means known in the art such as, but not limited to, Banbury mixing, extrusion compounding, roll milling, calendering, compression molding, injection molding and/or sheet extrusion. Useful temperatures for processing the substantially random interpolymer(s) in combination with optional additives to the floor, wall and ceiling covering of the present invention generally are from about 100° C. to about 300° C., preferably from about 120° C. to about 250° C., more preferably from about 140° C. to about 200° C.

The floor, wall or ceiling covering of the present invention may be foamed or may comprise one or more foam layers. Specifically, the layer(s) containing the above-described substantially random interpolymer(s) and/or one or more of the above-described additional polymeric layer(s), if present, may be foamed.

The foam layer(s) may be produced by an extrusion process or from expandable or foamable particles, moldable foam particles, or beads from which a sheet is formed by expansion and/or coalescing and welding of those particles.

The foam structure may be made by a conventional extrusion foaming process. The structure is generally prepared by heating a polymer material to form a plasticized or melt polymer material, incorporating therein a known blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer or blender. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel is then extruded or conveyed through a die of desired shape to a zone of reduced or lower pressure to form the foam structure. The die can have a substantially rectangular orifice to produce a sheet of the desired width and height. Alternatively, the die can have multiple orifices to produce polymer strands which can be cut to beads. The zone of lower pressure is at a pressure lower than that in which the foamable gel is maintained prior to extrusion through the die. The lower pressure may be superatmospheric or subatmospheric (vacuum), but is preferably at an atmospheric level.

The foam structure may also be formed into foam beads suitable for molding into articles. To make the foam beads, discrete resin particles such as granulated resin pellets are suspended in a liquid medium in which they are substantially insoluble such as water; impregnated with a blowing agent by introducing the blowing agent into the liquid medium at an elevated pressure and temperature in an autoclave or other pressure vessel; and rapidly discharged into the atmosphere or a region of reduced pressure to expand to form the foam beads. This process is well taught in U.S. Pat. Nos. 4,379,859 and 4,464,484, which are incorporated herein by reference.

The foam beads may then be molded by any means known in the art, such as charging the foam beads to the mold, compressing the mold to compress the beads, and heating the beads such as with steam to effect coalescing and welding of the beads to form the article. Optionally, the beads may be impregnated with air or other blowing agent at an elevated pressure and temperature prior to charging to the mold. Further, the beads may be heated prior to charging. The foam beads may then be molded to sheets by a suitable molding method known in the art. Some of the methods are taught in U.S. Pat. Nos. 3,504,068 and 3,953,558.

Various additives may be incorporated in the foam structure, such as stability control agents, nucleating agents, inorganic fillers, pigments, antioxidants, acid scavengers, ultraviolet absorbers, flame retardants, processing aids or extrusion aids. Some of the additives are described in more detail above.

Particularly preferred are floor sheeting, floor tiles, wall sheeting and wall tiles. They are useful in private and public buildings. They can also be used for covering floors outside of buildings, such as balconies and terraces. The floor, wall and particularly the ceiling coverings of the present invention are also useful as sound deadening materials. Floor, wall or ceiling coverings of the present inventions are also useful in geological areas, for example in caves or tunnels as PVC replacement. The floor, wall or ceiling coverings of the present invention have a number properties which make them particularly suitable for the intended end-use. Depending on the chosen types and amounts of substantially random interpolymer(s) and optional additives, the floor and wall coverings of the present invention have some or all of these properties, such as good indentation resistance, indentation recovery, good flexibility and conformability over contoured or uneven surfaces, good scratch resistance and/or good abrasion resistance.

Moreover, the floor, wall or ceiling covering of the present invention can be substantially free of halogen-containing compounds.

Furthermore, generally no coupling agent is required when including a filler in the floor, wall or ceiling covering. Surprisingly, the floor, wall or ceiling covering of the present invention which contains an above-described substantially random interpolymer can generally comprise a filler content of 70 weight percent or more, in many cases even 80 weight percent or more and typically up to 95 weight percent without requiring the presence of a coupling agent and still exhibiting good filler holding and good solid state properties. This is unexpected, since many of the above-mentioned substantially random interpolymers are largely unfunctionalized.

Generally common adhesives, such as acrylic or styrene/butadiene based adhesives can be used to fix the floor, wall or ceiling covering on floor, walls or lo ceilings. The use of adhesion promoters, such as surface oxidation via corona or flame treatment or acrylic primers in combination with these adhesives is generally not necessary.

The following examples are provided to illustrate the present invention. The examples are not intended to limit the scope of the present invention and they should not be so interpreted. Amounts are in weight parts or weight percentages unless otherwise indicated.

Testing

The properties of the polymers and blends are determined by the following test procedures.

A) Test Methods for all Examples

Melt Index (MI) is determined by ASTM D-1238 (1979), Condition E (190° C.; 2.16 kg).

Hardness is measured using a Hardness Tester for Shore A and D according to DIN 53505.

B) Test Methods for Examples 1 to 34

Tensile strength, secant modulus, and elongation properties are measured using ASTM D 638, Type C.

For indentation testing, ASTM F 142-93 (Standard Test Method for Indentation of Resilient Floor-McBurney Test) and a modified test is used. In the modified test, a 140 lb. (64 kg) load is applied via a 4.5 mm diameter cylindrical foot. The load is applied for 10 minutes and the initial indentation is measured. The residual indentation is measured after 60 minutes. For the modified test, indentations are reported as a percent of initial plaque thickness. For residual indentation, the sample is given a "fail" rating if the cylindrical indent foot permanently cuts and damages the surface.

Scratch testing is carried out using an Erichson Universal Scratch Tester equipped with a 90°—180 µm diameter stylus. A load of 0.1 to 1.0 N is applied to this stylus, and the resulting scratch width is measured after 30 days by a Perthen Surface Profiler. Scratch width and depth is expressed in micrometers.

Taber abrasion is measured according to ASTM F-510.

Flexural modulus is measured using ASTM D 790-95A.

C) Test Methods for Examples 35 to 83

DIN abrasion is determined according to DIN 53516, measured at 10N.

The Franke bending stiffness is measured according to DIN 53121 at a temperature of 22° C. and at the relaxation times indicated in Tables 7 to 9 below.

Ultimate tensile strength and elongation are measured according to DIN 53504, specimen S2, 50 mm/min. cross head speed.

The roller creep is measured by passing a roller of 50 mm diameter loaded with a mass of 25 kg over a flooring strip of 26 cm×2 cm with a frequency of 21 cycles/minute. The creep is measured after 20,000 cycles (16 h) and after 8 h recovery.

The coefficient of friction is measured according to ISO 8295 modified by using a floor cleaning cloth.

The scratch depth, the visual scratch rating and the scratch detection limit are measured by means of a triangular knife on which a load between 1N and 14N is applied. The visual scratch rating indicates at which load the scratch can be seen. The detection limit indicates at which load the scratch can be felt with the finger. The indentation resistance, i.e. the original indentation after 150 min. compression, the final indentation after 150 min. relaxation time and percent recovery are measured according to DIN 51955.

The compression set is measured according to DIN 53517 at 23° C. after 504 h relaxation time.

Preparation of Ethylene/Styrene Interpolymers ESI-1, ESI-2, ESI-4, ESI-5, ESI-6 and ESI-7

Reactor Description

The single reactor used is a 6 gallon (22.7 L), oil jacketed, Autoclave continuously stirred tank reactor (CSTR). A magnetically coupled agitator with Lightning A-320 impellers provides the mixing. The reactor runs liquid full at 475 psig (3,275 kPa). Process flow is in the bottom and out the top. A heat transfer oil is circulated through the jacket of the reactor to remove some of the heat of reaction. After the exit from the reactor a micromotion flow meter is arranged that measures flow and solution density. All lines on the exit of the reactor are traced with 50 psi (344.7 kPa) steam and insulated.

Procedure

Ethylbenzene solvent is supplied to the mini-plant at 30 psig (207 kPa). The feed to the reactor is measured by a Micro-Motion mass flow meter. A variable speed diaphragm pump controls the feed rate. At the discharge of the solvent pump a side stream is taken to provide flush flows for the catalyst injection line (1 lb/hr (0.45 kg/hr)) and the reactor agitator (0.75 lb/hr (0.34 kg/hr)). These flows are measured by differential pressure flow meters and controlled by manual adjustment of micro-flow needle valves. Uninhibited styrene monomer is supplied to the mini-plant at 30 psig (207 kpa). The feed to the reactor is measured by a Micro-Motion mass flow meter. A variable speed diaphragm pump controls the feed rate. The styrene stream is mixed with the remaining solvent stream. Ethylene is supplied to the mini-plant at 600 psig (4,137 kPa). The ethylene stream is measured by a Micro-Motion mass flow meter just prior to the Research valve controlling flow. A Brooks flow meter/controllers is used to deliver hydrogen into the ethylene stream at the outlet of the ethylene control valve. The ethylene/hydrogen mixture is combined with the solvent/styrene stream at ambient temperature. The temperature of the solvent/monomer as it enters the reactor is reduced to about 5° C. by an exchanger with −5° C. glycol on the jacket. This stream enters the bottom of the reactor. The three component catalyst system and its solvent flush also enter the reactor at the bottom but through a different port than the monomer stream. For preparing ESI-1, ESI-2 and ESI-4, ESI-5, ESI-6 and ESI-7, (t-butylamido)dimethyl (tetramethylcyclopentadienyl)silanetitanium (II) 1,3-pentadiene is used as a titanium catalyst and modified methylaluminoxane Type 3A (MMAO-3A, commercially available from Akzo) is used as a second catalyst component. Boron cocatalysts used are tris(pentafluorophenyl)borane (for preparing ESI-1 and ESI-2) or bis-hydrogenated tallowalkyl methylammonium tetrakis(pentafluorophenyl)borate respectively (for preparing ESI-4, ESI-5, ESI-6 and ESI-7). For preparing ESI-1, the molar ratio between the boron cocatalyst and the titanium catalyst is 3:1 and the molar ratio between MAD-3A and the titanium catalyst is 8:1. For preparing ESI-2 and ESI-4, the molar ratio between the boron cocatalyst and the titanium catalyst is 2:1 and the molar ratio between MMAO-3A and the titanium catalyst is 5:1. For preparing ESI-5, ESI-6 and ESI-7, the molar ratio between the boron cocatalyst and the titanium catalyst is 1.25:1 and the molar ratio between MMAO-3A and the titanium catalyst is 12:1. Preparation of the catalyst components has taken place in an inert atmosphere glove box. The diluted components are put in nitrogen padded cylinders and charged to the catalyst run tanks in the process area. From these run tanks the catalyst is pressured up with piston pumps and the flow is measured with Micro-Motion mass flow meters. These streams combine with each other and the catalyst flush solvent just prior to entry through a single injection line into the reactor.

Polymerization is stopped with the addition of catalyst kill (water mixed with solvent) into the reactor product line after the micromotion flow meter measuring the solution density. Other polymer additives can be added with the catalyst kill. A static mixer in the line provides dispersion of the catalyst kill and additives in the reactor effluent stream. This stream next enters post reactor heaters that provide additional energy for the solvent removal flash. This flash occurs as the effluent exits the post reactor heater and the pressure drops from 475 psig (3,275 kPa) down to about 250 mm of pressure absolute at the reactor pressure control valve. This flashed polymer enters a hot oil jacketed devolatilizer. Approximately 85 percent of the volatiles are removed from the polymer in the devolatilizer. The volatiles exit the top of the devolatilizer. The stream is condensed with a glycol jacketed exchanger, enters the suction of a vacuum pump and is discharged to a glycol jacket solvent and styrene/ethylene separation vessel. Solvent and styrene are removed from the bottom of the vessel and ethylene from the top. The ethylene stream is measured with a Micro-Motion mass flow meter and analyzed for composition. The measurement of vented ethylene plus a calculation of the dissolved gasses in the solvent/styrene stream are used to calculate the ethylene conversion. The polymer separated in the devolatilizer is pumped out with a gear pump to a ZSK-30 devolatilizing vacuum extruder. The dry polymer exits the extruder as a single strand. This strand is cooled as it is pulled through a water bath. Excess water is blown from the strand with air and the strand is chopped into pellets with a strand chopper.

The monomer amounts and polymerization conditions are provided in Table 1A. The polymer properties of ESI-1 to ESI-8 are provided in Table 1 C further below.

TABLE 1A

| | Reactor Temp. | Solv. Flow | | Ethylene Flow | | Hydrogen Flow | Styrene Flow | | Ethylene reactor conversion |
|---|---|---|---|---|---|---|---|---|---|
| | ° C. | lb/hr | kg/hr | lb/hr | kg/hr | SCCM | lb/hr | kg/hr | % |
| ESI-1 | 62.1 | 10.4 | 4.72 | 1.2 | 0.54 | 20.0 | 12.0 | 5.45 | 77.7 |
| ESI-2 | 84.3 | 17.6 | 7.99 | 1.9 | 0.86 | 27.6 | 20.6 | 9.35 | 75.6 |
| ESI-4 | 76.0 | 16.4 | 7.44 | 1.2 | 0.54 | 7.0 | 10.0 | 4.54 | 90.5 |
| ESI-5 | 64.8 | 14.0 | 6.35 | 1.2 | 0.54 | 0.0 | 20.0 | 9.08 | 87.3 |
| ESI-6 | 68.7 | 11.0 | 4.99 | 1.4 | 0.64 | 6.0 | 23.0 | 10.44 | 86.4 |
| ESI-7 | 109.7 | 12.0 | 5.44 | 2.3 | 1.04 | 2.7 | 13.0 | 5.9 | 84.3 |

Preparation of Ethylene/Styrene Interpolymer ESI-3

The polymer is prepared in a 400 gallon (1514 liter) agitated semi-continuous batch reactor. The reaction mixture consists of about 250 gallons (946 liter) of styrene and a solvent comprising a mixture of cyclohexane (85 weight percent) and isopentane (15 weight percent). Prior to addition, solvent, styrene and ethylene are purified to remove water and oxygen. The inhibitor in the styrene is also removed. Inerts are removed by purging the vessel with ethylene. The vessel is then pressure controlled to a set point with ethylene. Hydrogen is added to control molecular weight. The temperature in the vessel is controlled to set-point by varying the jacket water temperature on the vessel. Prior to polymerization, the vessel is heated to the desired run temperature and the catalyst components, i.e. (tert-butylamido)dimethyl(tetramethyl-η5-cyclopentadienyl)silane 5dimethyltitatium(IV) catalyst, CAS# 135072-62-7, Tris(pentafluorophenyl)boron, CAS# 001109-15-5, Modified methylaluminoxane Type 3A, CAS# 146905-79-5, are flow controlled, on a mole ratio basis of 1/3/5 respectively, combined and added to the vessel. After starting, the polymerization is allowed to proceed with ethylene supplied to the reactor as required to maintain vessel pressure. In some cases, hydrogen is added to the headspace of the reactor to maintain a mole ratio with respect to the ethylene concentration. At the end of the run, the catalyst flow is stopped, ethylene is removed from the reactor, about 1000 ppm of Irganox™ 1010 anti-oxidant is then added to the solution and the polymer is isolated from the solution. The resulting polymers are isolated from solution by stripping with steam in a vessel. In the case of the steam stripped material, additional processing is required in extruder like equipment to reduce residual moisture and any unreacted styrene.

The monomer amounts and polymerization conditions are provided in Table 1B.

TABLE 1B

| Solvent Sample Number | Styrene loaded | | loaded | | Pressure | | Temp. | Total H$_2$ Added | Run Time | Polymer in Solution |
|---|---|---|---|---|---|---|---|---|---|---|
| | lbs | kg | lbs | kg | Psig | kPa | °C. | Grams | Hours | Wt. % |
| ESI-3 | 252 | 114 | 1320 | 600 | 40 | 276 | 60 | 23 | 6.5 | 18.0 |

Preparation of Ethylene/Styrene Interpolymer ESI-8

ESI-8 is prepared by dry-blending 80 weight percent of the ethylene/styrene interpolymer ESI-5 and 20 weight percent of the ethylene/styrene interpolymer ESI-6.

TABLE 1C

| Inter-polymer | Tg °C. | Melt Index g/10 min | Total % Styrene (NMR) | | Styrene in ethylene/ styrene Interpolymer (NMR) | |
|---|---|---|---|---|---|---|
| | | | mol % | wt. % | mol % | wt. % |
| ESI-1 | na* | 2.0 | 30.3 | 60.0 | na* | na* |
| ESI-2 | na* | 30.0 | 32.0 | 62.0 | 10.3 | 28.4 |
| ESI-3 | 25 | 1.8 | 46.1 | 74.8 | 43.4 | 72.7 |
| ESI-4 | 17 | 2.2 | 41.3 | 70.9 | 40.2 | 70.0 |
| ESI-5 | 25 | 2.4 | 49.1 | 77.0 | 44.9 | 73.8 |
| ESI-6 | 14 | 1.3 | 46.1 | 74.8 | 37.0 | 67.1 |
| ESI-7 | −18 | 4.0 | 22.5 | 50.2 | 13.9 | 35.9 |
| ESI-8 | 24 | 1.3 | 47.7 | 76.0 | 42.6 | 72.0 |

*na = not analyzed

TABLE 2

Other Materials used in Examples

| Abbre-viation | Product Name | Melt Index (gm/10 min) | Density (gm/cc) |
|---|---|---|---|
| ITP-2 | AFFINITY™ DSH 1500.00 (ethylene-1-octene copolymer) | 1.0 | 0.902 |

TABLE 2-continued

Other Materials used in Examples

| Abbre-viation | Product Name | Melt Index (gm/10 min) | Density (gm/cc) |
|---|---|---|---|
| ITP-3 | AFFINITY SM 8400 (ethylene-1-octene copolymer) | 30.0 | 0.871 |
| ITP-4 | AFFINITY SM 1300 (ethylene-1-octene copolymer) | 30.0 | 0.902 |
| VP 8770 | AFFINITY™ VP 8770 (ethylene-1-octene copolymer) | 1.0 | 0.885 |
| LD 150 | low density polyethylene | 0.25 | 0.921 |
| HD 53050E | high density polyethylene | $I_5$ = 0.3 | 0.952 |
| HD 35060E | high density polyethylene | 0.29 | 0.96 |
| PE-g-MAH | Dow XU-60769.04 (maleic anhydride graft polyethylene, containing 1.0 percent maleic acid) | 2.5 | 0.955 |
| CaCO$_3$ | Pfizer ATF-40 (Ground limestone, 40 mesh) | | |
| Oil | SHELLFLEX™ 371 | | |

EXAMPLES 1 to 33

In Examples 1 to 33 plaques are prepared via the following steps: 1) Haake bowl mixing, 2) roll milling, and 3) compression molding into plaques. A Haake mixer equipped with a Rheomix 3000 bowl is used. All components of the blend are added to the mixer, and the rotor is operated at 190° C. and 40 rpm for 10 to 15 minutes. The material is then dropped out of the Haake, and fed to a 6 inch diameter× 12 inch wide Farrel two-roll mill set at 175° C. surface temperature. The sheet is either taken off after a 180° wrap or is allowed to wrap 540° before release. The sheet is then cut and compression molded into 3.175 mm thick×101.6 mm×101.6 mm plaques with a Pasadena Hydraulics Incorporated (PHI) press. The press is operated at 205° C. in a preheat mode at minimal pressure for 3 minutes, and is then pressured up to 15 tons for 2 minutes. Plaques are then removed from the heat and cooled at 15 tons for 3 minutes.

Properties of the compression molded plaques are measured as indicated above.

Tables 3, 4, and 5 list the compositions and resulting physical properties of Examples 1 to 31 according to the present invention and of comparative Examples 32 and 33 (not within the scope of the present invention, but not prior art), for 0 percent filled, 60 percent filled, and 85 percent filled formulations, respectively.

TABLE 3

| EXAMPLE # | 1 | 2 | 3 | 4 | 5 | 6 | 7 | 8 |
|---|---|---|---|---|---|---|---|---|
| COMPOSITION - weight percent | | | | | | | | |
| CaCO₃ | 0 | 0 | 0 | 0 | 0 | 0 | 0 | 0 |
| ESI-1 | 100 | | | | | | | |
| ESI-3 | | 100 | | | 80 | 90 | 70 | 50 |
| ESI-4 | | | 100 | | | | | 50 |
| Oil | | | | 20 | | | | |
| ITP-1 | | | | | | | 50 | 50 |
| ITP-2 | | | | | 10 | 30 | | |
| PROPERTIES | | | | | | | | |
| Tensile Strength (MPa) | 7.97 | 13.61 | 10.01 | 9.62 | 13.10 | 12.69 | 9.03 | 8.13 |
| 2% Secant Mod (MPa) | 5.79 | 13.61 | 8.01 | 3.79 | 23.50 | 35.62 | 16.64 | 11.75 |
| Flex Modulus (MPa) | 20.44 | 138.6 | 8.94 | 20.20 | 140.3 | 144.8 | 47.83 | 12.02 |
| Elongation at break (%) | 776 | 304 | 382 | 435 | 295 | 318 | 450 | 476 |
| Hardness-Shore D | 19.4 | 61.6 | 38.8 | 20 | 63 | 54.8 | 35.8 | 36.6 |
| Hardness-Shore A | 65.6 | 96.8 | 88.6 | 63 | 97 | 96.6 | 86.2 | 78.8 |
| Indentation-14 kg - 1 min (mil) | 33 | 30 | 14 | 28 | 27 | 21 | 27 | 17 |
| Indentation-14 kg - 10 min (mil) | nt | nt | nt | nt | nt | nt | nt | nt |
| Indentation-64 kg (% of Thickness) | 80 | 58 | 63 | 75 | 55 | 56 | 79 | 81 |
| Residual Indentation-64 kg (% of | 15 | 20 | 1.6 | 10 | 21 | 17 | 37 | 22 |
| Scratch width (micron) | nt | 96 | 0** | nt | 84 | 78 | nt | 0** |
| Scratch depth (micron) | nt | 1.63 | 0** | nt | 1.28 | 2.6 | nt | 0** |
| Taber abrasion (mg/100 rev) | 0*** | 1.86 | 1.08 | 0.28 | 3.24 | 2.78 | 2.16 | 1.78 |

**Scratch "healed"
***No measurable loss
nt = not tested

Examples 1 to 8 in Table 3 illustrate that floor, wall or ceiling coverings comprising an above-described substantially random interpolymer have a good balance of properties, such low flexural modulus (that means high flexibility), sufficient indentation and scratch resistance and, compared to the PVC material of comparative example 34, improved abrasion resistance.

The products of Examples 1 to 8 are useful as an unfilled homogeneous floor covering or as an individual layer in a heterogeneous structure. In addition, the exceptional scratch resistance of the ethylene/styrene interpolymers with at least about 60 weight percent (about 30 mol percent) interpolymerized styrene, such as in Example 3, makes the material suitable as a wear or surface layer of the floor covering of the present invention.

TABLE 4

| EXAMPLE # | 9 | 10 | 11 | 12 | 13 | 14 | 15 | 16 | 17 | 18 |
|---|---|---|---|---|---|---|---|---|---|---|
| COMPOSITION - weight percent | | | | | | | | | | |
| CaCO₃ | 60 | 60 | 60 | 60 | 60 | 60 | 60 | 60 | 60 | 60 |
| ESI-1 | 40 | | | | | | | | 36 | |
| ESI-3 | | 40 | | | 32 | 36 | 28 | 20 | | 36 |
| ESI-4 | | | | 40 | 20 | | | | | |
| Oil | | | | | 8 | | | | | |
| ITP-1 | | | | | | 4 | 12 | 20 | 20 | |
| PE-g-MAH | | | | | | | | | 4 | 4 |
| PROPERTIES | | | | | | | | | | |
| Tensile Strength (MPa) | 1.90 | 5.81 | 3.83 | 2.54 | 5.23 | 4.55 | 3.62 | 2.71 | 3.77 | 7.52 |
| 2% Secant Mod (MPa) | 19.50 | 87.45 | 32.12 | 15.12 | 58.50 | 61.83 | 60.83 | 38.94 | 26.94 | 502.6 |
| Flex Modulus (MPa) | 30.88 | 514.7 | 41.34 | 40.20 | 196.9 | 198.4 | 139.5 | 45.69 | 37.43 | 111.0 |
| Elongation at break (%) | 460 | 24.25 | 196 | 309.6 | 68.35 | 36.6 | 244 | 212 | 100.2 | 31.9 |
| Hardness-Shore D | 35.6 | 75.2 | 56.2 | 50.6 | 71.6 | 86.4 | 48 | 36.6 | 40.6 | 70.6 |
| Hardness-Shore A | 86 | 97.6 | 91.4 | 81.2 | 97.8 | 96.6 | 95 | 78.8 | 90.4 | 98 |
| Indentation-14 kg - 1 min (mil) | 24 | 13 | 14 | 19 | 15 | 18 | 20 | 14 | 21 | 14 |
| Indentation-14 kg - 10 min (mil) | 53 | 26 | 23 | 40 | 28 | 31 | 34 | 23 | 47 | 26 |
| Indentation-64 kg (% of Thickness) | 76 | 19.8 | 61 | 68 | 31 | 41 | 74 | 67 | 78 | 24 |
| Residual Indentation-64 kg (% of | 21 | 5.8 | 1.5 | 6.6 | 5.1 | 5.8 | 20.7 | 14 | fail | 7.3 |
| Scratch width (micron) | nt | nt | nt | nt | nt | 48 | nt | nt | nt | 102 |
| Scratch depth (micron) | nt | nt | nt | nt | nt | 2.37 | nt | nt | nt | 2.77 |
| Taber abrasion (mg/100 rev) | 0.60 | 3.92 | 2.88 | 1.46 | 4.98 | 5.86 | 6.88 | 5.88 | 1.12 | 7.52 | nt = not tested

Examples 9 to 18 illustrate that no additive or polymeric coupling agent is required to achieve good filler holding and solid state properties. The products of Examples 9 to 18 are useful as a filled homogeneous floor covering or as an individual layer in a heterogeneous structure. The products of Examples 9 to 18 are especially suited for floor sheeting products.

TABLE 5

| EXAMPLE # | 19 | 20 | 21 | 22 | 23 | 24 | 25 |
|---|---|---|---|---|---|---|---|
| COMPOSITION - weight percent | | 8 | | | | | |
| CaCO3 | 85 | 85 | 85 | 85 | 85 | 85 | 85 |
| ESI-2 | 15 | | | | | | |
| ESI-3 | | 15 | | 12 | 13.5 | 10.5 | 7.5 |
| ESI-4 | | | 15 | | | | |
| Oil | | | | 3 | | | |
| ITP-3 | | | | | 1.5 | 4.5 | 7.5 |
| ITP-4 | | | | | | | |
| PE-g-MAH | | | | | | | |
| PROPERTIES | | | | | | | |
| Tensile Strength (MPa) | 5.50 | 1.41 | 11.10 | 4.26 | nt | 8.41 | 6.06 |
| 2% Secant Mod (MPa) | 132 | 515 | 234 | 54 | 569 | 386 | 282 |
| Flex Modulus (MPa) | 182 | 1701 | 273 | 77 | 2103 | 1209 | 660 |
| Elongation at break (%) | 2.45 | 0.15 | 5.9 | 8.7 | | 2.05 | 5.4 |
| Hardness-Shore D | 87 | 85 | 82 | 63 | 83 | 73 | 65 |
| Hardness-Shore A | 96 | 98 | 96 | 92 | 98 | 99 | 98 |
| Indentation-14 kg - 1 min (mil) | 12 | 4 | 5 | 14 | 5 | 8 | 10 |
| Indentation-14 kg - 10 min (mil) | 21 | 7 | 10 | 29 | 8 | 13 | 15 |
| Indentation-64 kg (% of Thickness) | 71 | 4.1 | 9 | 61 | 4.8 | nt | 28 |
| Residual Indentation-64 kg (% of Thickness) | fail | 1.7 | O.7 | 11.8 | 2.1 | 2.5 | 6.9 |
| Scratch width (micron) | 77 | 77 | 59 | 64 | 56 | 73 | 80 |
| Scratch depth (micron) | 4.80 | 2.51 | 1.89 | 5.26 | 2.05 | 5.65 | 4.97 |
| Taber (mg/100 rev) | 12.72 | 14.86 | 12.72 | 12.38 | 15.8 | 19.98 | 21.48 |

| EXAMPLE # | 26 | 27 | 28 | 29 | 30 | 31 | 32* | 33* |
|---|---|---|---|---|---|---|---|---|
| COMPOSITION - weight percent | | | | | | | | |
| CaCO3 | 85 | 85 | 85 | 85 | 85 | 85 | 85 | 85 |
| ESI-2 | | 7.5 | 7.5 | 13.5 | | | | |
| ESI-3 | 7.5 | | | | | | | |
| ESI-4 | | | | | 7.5 | | | |
| Oil | | | | | | | | |
| ITP-3 | | 7.5 | | 7.5 | | | 13.5 | |
| ITP-4 | 7.5 | | 7.5 | | | | | 13.5 |
| PE-g-MAH | | | | | 1.5 | 1.5 | 1.5 | 1.5 |
| PROPERTIES | | | | | | | | |
| Tensile Strength (MPa) | 13.43 | 4.42 | 9.61 | 6.39 | 6.30 | 2.26 | 5.77 | 11.83 |
| 2% Secant Mod (MPa) | 757 | 178 | 607 | 225 | 361 | 788 | 315 | 1012 |
| Flex Modulus (MPa) | 1709 | 235 | 1531 | 277 | 1101 | 2277 | 587 | 2728 |
| Elongation at break (%) | 0.65 | 9.2 | 3.6 | 6.3 | 3.65 | 0.05 | 5 | 1.7 |
| Hardness-Shore D | 74 | 53 | 66 | 63 | 70 | 78 | 57 | 70 |
| Hardness-Shore A | 98 | 95 | 98 | 96 | 98 | 99 | 97 | 98 |
| Indentation-14 kg - 1 min (mil) | 5 | 14 | 6 | 8 | 8 | 4 | 8 | 4 |
| Indentation-14 kg - 10 min (mil) | 7 | 19 | 8 | 13 | 12 | 6 | 11 | 5 |
| Indentation-64 kg (% of Thickness) | 5.2 | 89 | 9.9 | 30 | 15.5 | 7.5 | 91 | 5.8 |
| Residual Indentation-64 kg (% of Thickness) | 0.8 | fail | 2.3 | 7.5 | 7.4 | 2.8 | fail | 1.6 |
| Scratch width (micron) | 79 | 69 | nt | nt | 82 | 66 | 105 | 101 |
| Scratch depth (micron) | 5.16 | 12.41 | nt | nt | 7.93 | 3.46 | 9.07 | 6.19 |
| Taber (mg/100 rev) | nt | 18.66 | 17.48 | 21.76 | 18.22 | nt | 17.86 | 15.72 |

*Comparative Example, but not prior art
nt = not tested

The plaques of Examples 19 to 31 have a considerably higher scratch resistance than the plaques of Comparative Examples 32 to 33. The exceptional scratch resistance of the ethylene/styrene interpolymers with at least about 60 weight percent (about 30 mol percent) interpolymerized styrene, such as in Examples 20, 21 and 23, makes the material especially suited for flooring structures.

Examples 19 to 29 illustrate that no additive or polymeric coupling agent is required to achieve good filler holding and solid state properties.

The plaque of Example 21 shows an exceptional combination of flexibility and indentation resistance, and is useful in or as a floor tile product with good installability and good conformability to uneven and contoured surfaces.

The products of Examples 19 to 29 are useful as a filled homogeneous floor covering or as an individual layer in a heterogeneous structure. The products of Examples 19 to 29 are especially suited for floor tile products.

Comparative Example 34

The properties of a high quality flexible PVC material which is commercially available from Armstrong under the trade designation "Imperial" tile and has a thickness of 3.175 mm are measured as in Examples 1 to 33. The flexural modulus is 696 MPa (100,760 psi), the indentation at 14 kg load and 1 min. is 10 mils (254 micrometers), the indentation at 14 kg load and 10 min. is 12 mils (305 micrometers), the initial indentation at 64 kg load is 11 percent of the total thickness and the residual indentation at 64 kg load is 4 percent of the total thickness. The Taber abrasion is 40 mg/100 rev. The Taber abrasion of all floor, wall or coiling coverings of Examples 1 to 25 and 27 to 30 according to the present invention show a substantially lower abrasion than that of the comparative PVC material (the Taber abrasion of Examples 26 and 31 was not tested).

The compositions of the mono- and multilayer sheets of Examples 35 to 37 and 39 to 44 and of comparative example 38 are listed in Table 6 below.

TABLE 6

| EXAMPLE # | Example 35 | Example 36 | Example 37 | Comp. Ex. 38* | Example 39 | Example 40 | Example 41 | Example 42 | Example 43 | Example 44 |
|---|---|---|---|---|---|---|---|---|---|---|
| Franke bending stiffness | 0.5 mm ESI-5 1.5 mm B) | 0.5 mm ESI-6 1.5 mm B) | 0.5 mm ESI-7 1.5 mm B) | 2 mm B) | 2 mm ESI-5 | 2 mm ESI-6 | 2 mm ESI-7 | 2 mm ESI-8 | 0.5 mm ESI-5 1.5 mm ESI-7 | 0.5 mm ESI-7 1.5 mm ESI-8 |
| $S_t$ (Nmm) | | | | | | | | | | |
| 0 sec | 31.9 | 18.5 | | 65.8 | 20.1 | 5.5 | 12.9 | 11.7 | 19.2 | 13.5 |
| 2 sec | 19.7 | 17.2 | 21.0 | 60.4 | 7.6 | 4.6 | 12.9 | 5.5 | 12.5 | 8.7 |
| 5 sec | 18.5 | 16.0 | 20.1 | 57.8 | 6.2 | 4.2 | 11.4 | 4.8 | 11.6 | 8.2 |
| 10 sec | 17.8 | 15.6 | 19.1 | 55.0 | 5.2 | 4.0 | 11.5 | 4.1 | 8.9 | 7.5 |
| 20 sec | 14.6 | 14.1 | 17.9 | 51.8 | 4.5 | 4.4 | 10.9 | 3.9 | 7.5 | 7.0 |
| 60 sec | 13.7 | 12.7 | 17.5 | 46.4 | 3.8 | 4.0 | 10.6 | 3.4 | 6.2 | 6.6 |

*Comparative Example

EXAMPLES 35 to 44

In examples 38 to 42 sheets of 2 mm thickness are prepared according to the following method: A mold consisting of a steel plate covered with a Teflon™ material and a frame of 28 cm×28 cm×0.2 cm is used. Powder or granules of the appropriate polymer is filled into the mold. The mass of the polymer filled into the frame is the volume of the mold, that is 156.8 cm³×density of the polymer+10 percent. The mold is closed with a plate of steel and pressed at elevated temperature.

In comparative example 38 the material of layer B), as described below, is pre-pressed for 6 min. at 8 bar and for 5 min. at 100 bar machine pressure at a temperature of 190° C. The mold is cooled from 150° C. to 95° C. in a period of 3 min. 15 sec. (minimum) to 4 min. 12 sec. (maximum).

In Examples 39 to 42 the ESI material is pre-pressed for 5 min. at 8 bar and for 3 min. at 200 bar machine pressure at a temperature of 175° C. The mold is placed between a water cooled steel bottom plate and top plate and cooled to room temperature within 5 min.

In examples 35 to 37 multilayer sheets are prepared which consist of
   a layer A) made of an ESI listed in Table 7 below of a thickness of 0.5 mm and
   a layer B) of a thickness of 1.5 mm and made of a blend of 49 percent of an Affinity™ EG 8150 polyolefin plastomer, 27 percent of EDPE 53050E, 10 percent IDPE 150, all commercially available from THE DOW CHEMICAL COMPANY, and 14 percent Lupolen UHM 201, commercially available from BASF.

Sheets of 1.5 mm thickness are prepared from the material of layer B) (examples 35 to 37) or from ESI (examples 43 and 44) as described above for examples 38 to 42. The sheets are preheated without pressing on a steel plate. The steel plate is heated to 160° C. to 170° C. in the case of layer B) and to 120° C. to 130° C. in the case of ESI. An ESI film of 0.5 mm thickness is pressed on the preheated sheet. In the case of a 1.5 mm layer B) the pressure is 5 min. at 3 bar and 3 min at 10 bar. In the case of a 1.5 mm ESI layer the pressure is 1 min. at 3 bar and 1 min. at 15 bar. The produced multilayer sheet is cooled to room temperature within 5 min.

Table 6 illustrates that floor, wall or ceiling coverings of the present invention containing an above-described substantially random interpolymer have a considerably lower Franke bending stiffness than the shoot of Comparative Example 38 which contains a bland of polyethylenes. Furthermore, the floor, wall or ceiling coverings of the present invention reach a very low stiffness value after a very short time. Surprisingly, the Franke bending stiffness of the multilayer sheets of examples 35 to 37 is considerably lower than what could be expected based on the Franke bending stiffness of the individual layers of a comparative thickness, although the ESI layer is only 25 percent of the total thickness of the sheet.

EXAMPLES 39, 41 and 45 to 83

In Examples 45 to 56 and 59 to 83 sheet s of 2 mm thickness are prepared as in Examples 38 to 42.

The PVC flooring material of comparative example 57 has a thickness of 2 mm. It is a high quality PVC flooring and contains 30 weight percent filler. It is commercially available under the designation Tarkett Eminent.

The polyolefin flooring material of comparative example 58 has a thickness of 2 mm. It is a high quality polyolefin flooring material based on Affinity™ polyolefin plastomer, polypropylene and polyethylene. It corresponds to the flooring material which is commercially available under the designation Tarkett SuperNova, but it does not contain a polyurethane coating.

The usefulness of the sheets as floor coverings are tested.

The composition of the sheets and their physical properties are listed in tables 7 to 9 below.

TABLE 7

| EXAMPLE # | 39 | 45 | 46 | 47 | 48 | 49 | 50 |
|---|---|---|---|---|---|---|---|
| COMPOSITION - weight percent | | | | | | | |
| ESI-5 | 100 | 80 | 67 | 50 | 33 | 20 | |
| ITP-2 | | 20 | 33 | 50 | 67 | 80 | 100 |
| HD35060E | | | | | | | |
| PVC flooring | | | | | | | |
| Polyolefin flooring | | | | | | | |
| PROPERTIES | | | | | | | |
| Hardness-Shore D (t = 3) | 60 | 57 | 54 | 50 | 45 | 43 | 44 |
| Hardness-Shore D (t = 15) | 54 | 51 | 49 | 46 | 43 | 41 | |
| Density (g/cm$^3$) | 1.018 | 0.996 | 0.986 | 0.965 | 0.939 | 0.927 | 0.905 |
| Din abrasion (mm$^3$) | 290 | 112 | 118 | 89 | 36 | 23 | 14 |
| Franke bending stiffn. | | | | | | | |
| $S_{max.}$ ((t = 0 sec.) | 20.1 | 59.0 | 64.4 | 50.2 | 50.6 | 47.6 | 37.0 |
| $S_1$ (t = 2 sec.) | 7.6 | 29.7 | 40.1 | 34.0 | 39.7 | 43.0 | 35.1 |
| $S_1$ (t = 5 sec.) | 6.2 | 20.0 | 26.8 | 29.3 | 36.7 | 39.0 | 35.7 |
| $S_1$ (t = 10 sec.) | 5.2 | 16.0 | 20.5 | 24.2 | 31.1 | 37.8 | 36.2 |
| $S_1$ (t = 20 sec.) | 4.5 | 12.4 | 18.7 | 22.1 | 28.6 | 32.5 | 33.7 |
| $S_1$ (t = 60 sec.) | 3.8 | 7.8 | 13.2 | 17.2 | 27.2 | 29.4 | 30.9 |
| Ult. tensile strength | 15.1 | 20.5 | 22.1 | 21.4 | 19.4 | 29.6 | 36.6 |
| Elongation (%) | 175 | 279 | 314 | 358 | 589 | 664 | 638 |
| Roller creep (%) | 0.01 | | | | | | 0.06 |
| Coefficient of friction | 1.25 | | | | | | |
| Scratch depth at 5N ($\mu$m) | 7.6 | | | | | | |
| Visual scratch rating (N) | 10 | | | | | | |
| Detection limit (N) | >14 | | | | | | |
| Compression set (%) | 22.4 | | | | | | |
| Original indentation | 0.381 | | | | | | |
| Final indentation | 0.023 | | | | | | |
| Recovery (%) | 94 | | | | | | |

| EXAMPLE # | 51 | 52 | 53 | 54 | 55 | 56 | 57 | 58 |
|---|---|---|---|---|---|---|---|---|
| COMPOSITION - weight percent | | | | | | | | |
| ESI-5 | 80 | 67 | 50 | 33 | 20 | | | |
| ITP-2 | | | | | | | | |
| HD35060E | 20 | 33 | 50 | 67 | 80 | 100 | | |
| PVC flooring | | | | | | | 100 | |
| Polyolefin flooring | | | | | | | | 100 |
| PROPERTIES | | | | | | | | |
| Hardness-Shore D (t = 3) | 61 | 62 | 59 | 59 | 61 | 63 | 50 | 36 |
| Hardness-Shore D (t = 15) | 56 | 57 | 57 | 56 | 58 | | 47 | |
| Density (g/cm$^3$) | 1.009 | 1.000 | 0.986 | 0.978 | 0.969 | 0.958 | | |
| Din abrasion (mm$^3$) | 98 | 128 | 105 | 137 | 151 | 154 | | |
| Franke bending stiffn. | | | | | | | | |
| $S_{max.}$ ((t = 0 sec.) | | | | | | | 57 | 38.6 |
| $S_1$ (t = 2 sec.) | | | | | | | 42.6 | 36.2 |
| $S_1$ (t = 5 sec.) | | | | | | | 32.1 | 32.4 |
| $S_1$ (t = 10 sec.) | | | | | | | 30.6 | 33.8 |
| $S_1$ (t = 20 sec.) | | | | | | | 27.5 | 32.8 |
| $S_1$ (t = 60 sec.) | | | | | | | 22.8 | 30.1 |
| Ult. tensile strength | 22.4 | 20.5 | 18.7 | 20.6 | 23.8 | | 10.1 | 8.2 |
| Elongation (%) | 274 | 265 | 287 | 417 | 796 | | 52 | 225 |
| Roller creep (%) | | | | | | | 0.02 | |
| Coefficient of friction | | | | | | | | |
| Scratch depth at 5N ($\mu$m) | | | | | | | 37.8 | 51.2 |
| Visual scratch rating (N) | | | | | | | 3 | 1 |
| Detection limit (N) | | | | | | | 8 | 5 |
| Compression set (%) | | | | | | | | |
| Original indentation | | | | | | | | |
| Final indentation | | | | | | | | |
| Recovery (%) | | | | | | | | |

*Comparative Example

TABLE 8

| EXAMPLE # | 41* | 59 | 60 | 51 | 62 | 63 | 50* |
|---|---|---|---|---|---|---|---|
| COMPOSITION - weight percent | | | | | | | |
| ESI-6 | | | | | | | |
| ESI-7 | 100 | 80 | 67 | 50 | 33 | 20 | |
| ITP-2 | | 20 | 33 | 50 | 67 | 80 | 100 |
| HD53050E | | | | | | | |
| HD35060E | | | | | | | |
| PROPERTIES | | | | | | | |
| Hardness-Shore D (t = 3) | 34 | 37 | 38 | 40 | 41 | 42 | 44 |
| Hardness-Shore D (t = 15) | | 33 | 36 | 37 | 38 | 40 | |
| Density (g/cm$^3$) | 0.963 | 0.953 | 0.960 | 0.933 | 0.922 | 0.913 | 0.905 |
| Din abrasion (mm$^3$) | 179 | 102 | 55 | 34 | 22 | 18 | 14 |
| Franke bending stiffn. | | | | | | | |
| $S_{max.}$ (t = 0 sec.) | 12.9 | 20.5 | 22.5 | 27.8 | 32.3 | 35.6 | 37.0 |
| $S_1$ (t = 2 sec.) | 12.9 | 17.8 | 20.7 | 26.5 | 30.4 | 35.7 | 35.1 |
| $S_1$ (t = 5 sec.) | 11.4 | 19.7 | 21.4 | 25.1 | 31.3 | 33.0 | 35.7 |
| $S_1$ (t = 10 sec.) | 11.5 | 18.8 | 20.4 | 24.5 | 29.8 | 32.7 | |
| $S_1$ (t = 20 sec.) | 10.9 | 18.3 | 19.9 | 23.4 | 27.3 | 31.1 | |
| $S_1$ (t = 60 sec.) | 10.6 | 15.7 | 17.7 | 23.6 | 28.2 | 30.5 | |
| Ult tensile Strength | 21.0 | 29.7 | 31.5 | 31.7 | 34.5 | 36.9 | 36.6 |
| Elongation (%) | 434 | 546 | 571 | 582 | 608 | 630 | 638 |
| Roller creep (%) | 0.32 | | | | | | 0.06 |
| Coefficient of friction | 5.2 | | | | | | |
| Scratch depth at 5N ($\mu$m) | 10.6 | | | | | | |
| Visual scratch rating (N) | 1 | | | | | | |
| Detection limit (N) | >14 | | | | | | |
| Compression set (%) | 28.8 | | | | | | |
| Original indentation | 0.323 | | | | | | |
| Final indentation | 0.007 | | | | | | |
| Recovery (%) | 98 | | | | | | |

| EXAMPLE # | 64 | 65 | 66 | 67 | 68 | 56* | 69 | 70 |
|---|---|---|---|---|---|---|---|---|
| COMPOSITION - weight percent | | | | | | | | |
| ESI-6 | | | | | | | | 100 |
| ESI-7 | 80 | 67 | 50 | 33 | 20 | 50 | | |
| ITP-2 | | | | | | | | |
| HD53050E | | | | | | | 50 | |
| HD35060E | 20 | 33 | 50 | 67 | 80 | 100 | | |
| PROPERTIES | | | | | | | | |
| Hardness-Shore D (t = 3) | 39 | 45 | 50 | 56 | 59 | 64 | 49 | 31 |
| Hardness-Shore D (t = 15) | 37 | 42 | 48 | 54 | 56 | | 46 | |
| Density (g/cm$^3$) | 0.967 | 0.969 | 0.965 | 0.960 | 0.955 | 0.958 | 0.956 | 1.007 |
| Din abrasion (mm$^3$) | 117 | 106 | 90 | 77 | 71 | 154 | 74 | 231 |
| Franke bending stiffn. | | | | | | | | |
| $S_{max.}$ (t = 0 sec.) | | | 127.1 | | | | 99.3 | 5.5 |
| $S_1$ (t = 2 sec.) | | | 113.7 | | | | 89.0 | 4.6 |
| $S_1$ (t = 5 sec.) | | | 103.1 | | | | 80.3 | 4.2 |
| $S_1$ (t = 10 sec.) | | | 94.6 | | | | 75.7 | 4.0 |
| $S_1$ (t = 20 sec.) | | | 90.9 | | | | 71.1 | 4.4 |
| $S_1$ (t = 60 sec.) | | | 78.4 | | | | 69.7 | 4.0 |
| Ult tensile Strength | 25.3 | 23.0 | 23.6 | 25.6 | | 25 | 19.1 | |
| Elongation (%) | 534 | 570 | 655 | 742 | | 586 | 250 | |
| Roller creep (%) | | | | | | | | 0.26 |
| Coefficient of friction | | | | | | | | 2.6 |
| Scratch depth at 5N ($\mu$m) | | | | | | | | 13.6 |
| Visual scratch rating (N) | | | | | | | | 3–4 |
| Detection limit (N) | | | | | | | | >14 |
| Compression set (%) | | | | | | | | 50.1 |
| Original indentation | | | | | | | | 0.416 |
| Final indentation | | | | | | | | 0.054 |
| Recovery (%) | | | | | | | | 87 |

*Comparative Example

TABLE 9

| EXAMPLE # | 41 | 71 | 72 | 73 | 74* | 75 | 76 |
|---|---|---|---|---|---|---|---|
| COMPOSITION - weight percent | | | | | | | |
| ESI-5 | | | | | | | |
| ESI-7 | 100 | 50 | 33 | 20 | | 50 | 33 |
| ESI-8 | | | | | | | |
| VP 8770 | | 50 | 67 | 80 | 100 | | |
| LD 150 | | | | | | 50 | 67 |
| PROPERTIES | | | | | | | |
| Hardness-Shore D (t = 3) | 34 | 34 | 33 | 33 | 35 | 40 | 42 |
| Hardness-Shore D (t = 15) | | 32 | 32 | 32 | 36 | 41 | |
| Density (g/cm$^3$) | 0.963 | 0.923 | 0.911 | 0.907 | 0.887 | 0.944 | 0.935 |
| Din abrasion (mm$^3$) | 179 | 35 | 26 | 22 | 18 | 66 | 57 |
| Franke bending stiffn. | | | | | | | |
| $S_{max.}$ (t = 0 sec.) | 12.9 | 23.7 | 19.3 | 19.8 | 16.3 | 39.8 | |
| $S_1$ (t = 2 sec.) | 12.9 | 23.1 | 18.6 | 20.1 | 16.1 | 37.0 | |
| $S_1$ (t = 5 sec.) | 11.4 | 21.7 | 18.0 | 18.2 | 16.0 | 32.7 | |
| $S_1$ (t = 10 sec.) | 11.5 | 22.3 | 18.1 | 17.5 | 15.5 | 32.6 | |
| $S_1$ (t = 20 sec.) | 10.9 | 21.9 | 17.0 | 18.5 | 15.0 | 31.9 | |
| $S_1$ (t = 60 sec.) | 10.6 | 19.8 | 17.6 | 18.5 | 14.0 | 29.8 | |
| Ultimate tensile strength | 21.0 | 30.4 | 29.4 | 35.2 | 31.8 | 19.0 | 16.8 |
| Elongation (%) | 434 | 615 | 628 | 648 | 665 | 519 | 534 |
| Roller creep (%) | 0.32 | | | | 0.62 | | 0.06 |
| Coefficient of friction | 5.2 | | | | | | |
| Scratch depth at 5N ($\mu$m) | 10.6 | | | | | | |
| Visual scratch rating (N) | 1 | | | | | | |
| Detection limit (N) | >14 | | | | | | |
| Compression set (%) | 28.8 | | | | | | |
| Original indentation | 0.323 | | | | | | |
| Final indentation | 0.007 | | | | | | |
| Recovery (%) | 98 | | | | | | |

| EXAMPLE # | 77 | 78 | 39 | 79 | 80 | 81 | 82 | 83 |
|---|---|---|---|---|---|---|---|---|
| COMPOSITION - weight percent | | | | | | | | |
| ESI-5 | | | 100 | 50 | 33 | 20 | | |
| ESI-7 | 20 | | | | | | | |
| ESI-8 | | | | | | | 100 | 50 |
| VP 8770 | | | | | | | | 50 |
| LD 150 | 80 | 100 | | 50 | 67 | 80 | | |
| PROPERTIES | | | | | | | | |
| Hardness-Shore D (t = 3) | 46 | 48 | 60 | 52 | 49 | 49 | 55 | 41 |
| Hardness-Shore D (t = 15) | 43 | | 54 | 48 | 46 | 47 | 46 | 36 |
| Density (g/cm$^3$) | 0.929 | 0.919 | 1.018 | 0.978 | 0.951 | 0.937 | 1.013 | 0.957 |
| Din abrasion (mm$^3$) | 50 | 42 | 290 | 119 | 100 | 76 | 266 | 181 |
| Franke bending stiffn. | | | | | | | | |
| $S_{max.}$ (t = 0 sec.) | | | 20.1 | 66.1 | | | 11.7 | 27.5 |
| $S_1$ (t = 2 sec.) | | | 7.6 | 42.7 | | | 5.5 | 18.3 |
| $S_1$ (t = 5 sec.) | | | 6.2 | 34.5 | | | 4.8 | 16.1 |
| $S_1$ (t = 10 sec.) | | | 5.2 | 28.9 | | | 4.1 | 13.6 |
| $S_1$ (t = 20 sec.) | | | 4.5 | 24.5 | | | 3.9 | 12.2 |
| $S_1$ (t = 60 sec.) | | | 3.8 | 18.6 | | | 3.4 | 11.5 |
| Ultimate tensile strength | 18.0 | | 15.1 | 16.7 | 11.8 | 12.2 | 19.2 | 18.5 |
| Elongation (%) | 600 | | 175 | 281 | 284 | 393 | 226 | 364 |
| Roller creep (%) | | | 0.01 | | | | | 0.14 |
| Coefficient of friction | | | 1.25 | | | | | 3.5 |
| Scratch depth at 5N ($\mu$m) | | | 7.6 | | | | 7.8 | |
| Visual scratch rating (N) | | | 10 | | | | | 1 |
| Detection limit (N) | | | >14 | | | | | 6 |
| Compression set (%) | | | 22.4 | | | | 21.7 | |
| Original indentation | | | 0.381 | | | | 0.34 | |
| Final indentation | | | 0.023 | | | | 0.003 | |
| Recovery (%) | | | 94 | | | | 99 | |

*Comparative Example

The comparison between a) examples 39 and 45 to 50, b) examples 39 and 51 to 56, c) examples 41, 59 to 63 and 50, and d) examples 41, 64 to 68 and 60, illustrate that a blond of an above-described substantially random interpolymer and a homopolymer or interpolymer of aliphatic α-olefin(s) having from 2 to about 20 carbon atoms have a much lower abrasion than could be expected based on the abrasion measurements of the individual components of the blend.

Examples 45, 59 and 64 illustrate that 20 percent of the polyolefin is sufficient to reduce the abrasion of the blend to 2/3 or even considerably less, compared with the abrasion of an ethylene/styrene interpolymer alone in examples 39 and 41. When an ethylene/styrene interpolymer is blended with a HDPE, as in examples 51 to 55 and 64 to 68, the abrasion of the blend is even lower than the abrasion of each individual component in examples 39, 41 and comparative example 56. These findings are confirmed by comparing a) examples 41 and 71 to 74, b) examples 41 and 75 to 79 and c) examples 39 and 79 to 81.

The comparison between examples 39, 41, 70, 82 and comparative examples 57 and 58 illustrates the excellent scratch resistance of floor coverings of the present invention, as compared to known floor coverings.

What is claimed is:

1. A floor, wall or ceiling covering comprising one or more substantially random interpolymers prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s).

2. The floor, wall or ceiling covering of claim 1 wherein said one or more interpolymers contain interpolymerized from about 35 to about 99.5 mole percent of one or more α-olefin monomers and from about 0.5 to about 65 mole percent of one or more vinylidene aromatic monomers and/or one or more hindered aliphatic or cycloaliphatic vinylidene monomers, and optionally other polymerizable ethylenically unsaturated monomer(s).

3. The floor, wall or ceiling covering of claim 1 wherein said one or more substantially random interpolymers contain one or more tetrad sequences consisting of α-olefinl vinylidene aromatic monomer/vinylidene aromatic monomer/α-olefin insertions detectable by $^{13}$C NMR spectroscopy wherein the monomer insertions of said tetrads occur exclusively in a 1,2 (head to tail) manner.

4. The floor, wall or ceiling covering of claim 1 wherein said one or more substantially random interpolymers contain interpolymerized from about 80 to about 50 mole percent of one or more α-olefin monomers and from about 20 to about 50 mole percent of one or more vinylidene aromatic monomers and/or one or more hindered aliphatic or cycloaliphatic vinylidene monomers, and optionally other polymerizable ethylenically unsaturated monomer(s).

5. The floor, wall or ceiling covering of claim 1 containing a filler in an amount of up to 95 percent, based on the total weight of the floor, wall or ceiling covering.

6. The floor, wall or ceiling covering of claim 5 in the shape of floor tiles and containing from about 50 to about 95 percent of a filler, based on the weight of the floor tiles.

7. The floor, wall or ceiling covering of claim 1 wherein the amount of said one or more substantially random interpolymers is from 5 to 100 percent, based on the total weight of the floor, wall or ceiling covering.

8. The floor, wall or ceiling covering of claim 1 comprising up to about 90 percent of one or more polymers other than said substantially random interpolymer(s), based on the total weight of the floor, wall or ceiling covering.

9. The floor, wall or ceiling covering of claim 1 comprising a blend of from about 5 to about 99 percent of said one or more substantially random interpolymers and about 95 to about 1 weight percent of one or more homopolymers or interpolymers of aliphatic α-olefins having from 2 to about 20 carbon atoms or α-olefins having from 2 to about 20 carbon atoms and containing polar groups, based on the total weight of the blend.

10. The floor, wall or ceiling covering of claim 9 comprising a blend of from about 5 to about 99 percent of said one or more substantially random interpolymers and about 95 to about 1 weight percent of one or more polymers selected from the group consisting of homopolymers of ethylene; homopolymers of propylene, copolymers of ethylene and at least one other α-olefin containing from 4 to 8 carbon atoms; copolymers of propylene and at least one other α-olefin containing from 4 to 8 carbon atoms; copolymers of ethylene and at least one of acrylic acid, vinyl acetate, maleic anhydride or acrylonitrile; copolymers of propylene and at least one of acrylic acid, vinyl acetate, maleic anhydride or acrylonitrile; and terpolymers of ethylene, propylene and a diene.

11. The floor, wall or ceiling covering of claim 1 containing at least two layers, wherein at least one layer (A) comprises said one or more substantially random interpolymers.

12. The floor, wall or ceiling covering of claim 11 wherein the thickness of said layer (A) is from about 25 μm to about 2 mm.

13. The floor, wall or ceiling covering of claim 11 wherein said layer (A) contains from about 25 to about 100 percent of said substantially random interpolymer(s), based on the total weight of layer (A).

14. The floor, wall or ceiling covering of claim 11 containing said layer (A) and one or more additional polymeric layers (B).

15. The floor, wall or ceiling covering of claim 14 wherein the thickness ratio between layer (A) and layer(s) (B) is from about 0.01:1 to about 10:1.

16. The floor, wall or ceiling covering of claim 14 wherein said layer (B) comprises one or more homopolymers or interpolymers of aliphatic α-olefins having from 2 to 20 carbon atoms or α-olefins having from 2 to 20 carbon atoms and containing polar groups.

17. The floor, wall or ceiling covering of claim 14 wherein said layer (B) contains a homopolymer of ethylene or propylene; or a copolymer of ethylene or propylene and at least one other α-olefin containing from 4 to 8 carbon atoms; or a copolymer of ethylene or propylene and at least one of acrylic acid, vinyl acetate, maleic anhydride or acrylonitrile; or a terpolymer of ethylene, propylene and a diene.

18. A floor, wall or ceiling covering of claim 14 wherein layer (A) and layer (B) each comprise said one or more substantially random interpolymers, wherein the average molar content of the vinylidene monomer component in the interpolymer(s) in layer (B) is different from the average molar content of the vinylidene monomer component in the interpolymer(s) in layer (A).

19. The floor, wall or ceiling covering of claim 11 comprising said layer (A) as the top layer.

* * * * *